United States Patent [19]

Mark, deceased et al.

[11] Patent Number: 4,628,081

[45] Date of Patent: Dec. 9, 1986

[54] POLYCARBONATE EXHIBITING IMPROVED IMPACT PROPERTIES

[75] Inventors: Victor Mark, deceased, late of Evansville, Ind., by Carol M. Mark, Ester H. Mark, legal representatives; Edward N. Peters, Lenox, Mass.

[73] Assignee: General Electric Company, Mt. Vernon, Ind.

[21] Appl. No.: 797,254

[22] Filed: Nov. 12, 1985

[51] Int. Cl.$^4$ .............................................. C08G 63/62
[52] U.S. Cl. .................................. 528/176; 528/194; 528/195; 528/196; 528/202
[58] Field of Search ........................ 525/333.2, 333.7; 528/176, 194, 195, 196, 202

[56] References Cited

U.S. PATENT DOCUMENTS

| | | | |
|---|---|---|---|
| 3,135,716 | 6/1964 | Uraneck et al. | 525/131 |
| 3,207,814 | 9/1965 | Goldberg | 528/194 |
| 3,285,949 | 11/1966 | Siebert | 528/84 |
| 3,431,235 | 3/1969 | Lubowitz | 525/122 |
| 3,632,800 | 1/1972 | Anderson | 525/333.7 |
| 3,705,208 | 12/1972 | Nakamuta et al. | 525/333.2 |
| 4,196,276 | 4/1980 | Schreckenberg et al. | 528/196 |
| 4,381,358 | 4/1983 | Rosenquist | 528/176 |
| 4,476,294 | 10/1984 | Mark | 528/176 |
| 4,501,875 | 2/1985 | Mark | 528/196 |
| 4,504,649 | 3/1985 | Mark | 528/176 |
| 4,526,956 | 7/1985 | Mark | 528/176 |

*Primary Examiner*—Veronica P. Hoke

*Attorney, Agent, or Firm*—Myron B. Kapustij; Martin B. Barancik

[57] ABSTRACT

High molecular weight aromatic carbonate resin comprised of the polymerized reaction products of:
(i) at least one dihydric phenol;
(ii) a carbonate precursor; and
(iii) an amount at least effective to improve the impact properties of said resin of at least one polymer selected from polymers represented by the formula

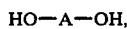

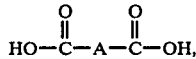

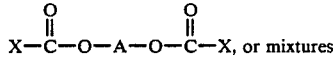 , or mixtures thereof;

wherein A is selected from the divalent residues of at least one polymerized and fully hydrogenated conjugated alkadiene and has a weight average molecular weight of at least about 600, and X is independently selected from halogen radicals.

At lower amounts of (iii) these resins exhibit improved impact properties, while at higher amounts of (iii) the resins exhibit rubbery and elastomeric characteristics.

27 Claims, No Drawings

POLYCARBONATE EXHIBITING IMPROVED IMPACT PROPERTIES

BACKGROUND OF THE INVENTION

Polycarbonates are well known thermoplastic materials which, due to their many advantageous properties, are used as thermoplastic engineering materials. The polycarbonates may generally be prepared by the reaction of a carbonate precursor such as phosgene with a dihydric phenol such as bisphenol-A. These polycarbonates exhibit, for example, excellent properties of toughness, flexibility, optical transparency, and high heat distortion temperatures. However, in certain applications better impact properties than those possessed by conventional polycarbonates are required. It is known that the impact properties of polycarbonates can be improved by blending with the polycarbonate resins certain impact modifiers. While the resultant compositions exhibit improved impact properties, the use of impact modifier additives suffers from several disadvantages. Among these disadvantages is the fact that some of these impact modifiers tend to adversely affect the optical properties, such as the transparency, of the polycarbonates. Another disadvantage lies in the fact that these compositions are blends of two different components thus resulting in the well known problems associated with multicomponent blends.

It would be very advantageous if polycarboncarbonates could be provided which exhibit improved impact properties as compared with conventional carbonate resins. It is, therefore, an object of the instant invention to provide carbonate resins exhibiting improved impact properties.

SUMMARY OF THE INVENTION

In accordance with the instant invention there are provided carbonate resins which are comprised of the polymerized reaction products of (i) at least one dihydric phenol, (ii) a carbonate precursor, and (iii) at least one polymer selected from polymers represented by the formulae

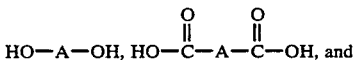

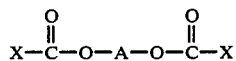

wherein A represents a divalent residue of a polymerized and hydrogenated alkadiene and has a weight average molecular weight of at least about 600, and X represents a halogen radical.

DESCRIPTION OF THE INVENTION

It has been discovered that carbonate resins can be obtained which exhibit improved impact properties as compared with conventional polycarbonates such as, for example, those derived from bisphenol-A and phosgene. The polycarbonate resins of the present invention are comprised of the polymerized reaction products of (i) at least one dihydric phenol, (ii) a carbonate precursor, and (iii) an amount at least effective to improve the impact properties of the carbonate resin of at least one compound represented by the formulae

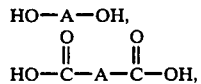

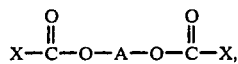

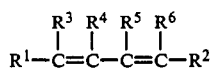

or mixtures thereof, wherein A represents the divalent residue of at least one polymerized and substantially fully hydrogenated conjugated alkadiene and has a weight average molecular weight of at least about 600, and X is independently selected from halogen radicals, preferably chlorine and bromine. The polymerized and hydrogenated conjugated alkadiene, whose divalent residue is represented by A, has a weight average molecular weight of at least about 600, preferably at least about 800, and more preferably at least about 1,000. The upper range of the weight average molecular weight should generally not exceed about 20,000, preferably about 10,000.

The conjugated alkadiene monomers used in the preparation of A may be represented by the formula $$R^1-C=C-C=C-R^2 \quad \text{IV.}$$
$$\phantom{R^1-C}\underset{R^3}{|}\underset{R^4}{|}\underset{R^5}{|}\underset{R^6}{|}$$

wherein $R^1$-$R^6$ are independently selected from hydrogen, halogen, and alkyl radicals, with the proviso that not more than 2 of $R^1$-$R^6$ are halogens, Preferably $R^1$-$R^6$ are independently selected from hydrogen and alkyl radicals.

The preferred alkyl radicals represented by $R^1$-$R^6$ are those containing from 1 to about 5 carbon atoms. These alkyl radicals include both the straight chain alkyl radicals and the branched alkyl radicals. However, the preferred alkyl radicals are the straight chain alkyl radicals. It is particularly preferred that if $R^1$ and/or $R^2$ are alkyl radicals that they be straight chain alkyl radicals.

Some illustrative non-limiting examples of conjugated alkadiene monomers of Formula IV include 1,3-butadiene, 2-chloro-1,3-butadiene, 2-methyl-1,3-butadiene, 1,3-heptadiene, 2-methyl-1,3-pentadiene, 2-methyl-3-ethyl-1,3-butadiene, 2-ethyl-1,3-pentadiene, 1,3-hexadiene, and 2,4-hexadiene.

Particularly useful conjugated alkadiene monomers of Formula IV are 1,3-butadiene, 2-methyl-1,3-butadiene, and mixtures thereof.

The compounds of Formulae I–III, as well as the monomers of Formula IV from which they are derived, are well known in the art and are generally commercially available or may be readily prepared by known methods. Thus, for example, one method of preparing the divalent residues of the polymerized and hydrogenated conjugated alkadienes A involves the polymerization and hydrogenation of at least one monomer of Formula IV. The polymerization process is described, inter alia, in Billmeyer, Fred W., Jr., *Textbook of Polymer Science* Interscience Publishers, New York, 1962, pages 192, 348–352 and 377–393, which is hereby incorporated herein by reference.

Hydrogenation of the polymer may be accomplished by techniques well known in the art. It may be done utilizing a variety of hydrogenation catalysts such as nickel on kieselguhr, Raney nickel, copper chromate, molybdenum sulfide, and finely divided platinum or other noble metals on a low surface area carrier. Hydrogenation may be conducted at any desired temperature or pressure, e.g., from atmospheric pressure to about 3,000 psi. The usual range being between 100 and 1,000 psi pressure at temperatures from 75° F. to 600° F. for times between 0.1 and 24 hours, preferably from 0.2 to 8 hours.

When A is the divalent residue of polymerized and hydrogenated 1,3-butadiene it may be comprised of the following recurring structural units:

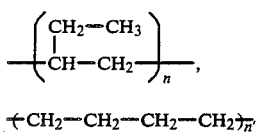  V.

$+CH_2-CH_2-CH_2-CH_2\}_{n'}$  Va.

or mixtures thereof. In Formulae V and Va n and n' have a value of at least about 10 and may be as high as about 400. If mixtures of V and Va are used then the sum of n+n' will have a value of at least 10 and may be as high as 400 (in such a case n and n' may have values as low as 1 provided the sum of n +n' is at least about 10).

The divalent residue represented by Formula V is derived from the 1,2-addition of the 1,3-butadiene monomer while the residue represented by Formula Va is derived from the 1,4-addition, either cis or trans, of the 1,3-butadiene monomer.

When A is the divalent residue of polymerized and hydrogenated 2-methyl-1,3-butadiene it is comprised of recurring structural units represented by the general formula

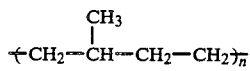  VI.

wherein n is as defined hereinafore.

As mentioned previously A may have a weight average molecular weight as high as about 20,000. It is preferred, however, that A have a weight average molecular weight between about 1,000 and about 10,000.

It is to be understood that A may contain the polymerized and hydrogenated reaction products of only one monomer of Formula IV or it may contain the polymerized and fully hydrogenated reaction products of a mixture of two or more different monomers of Formula IV.

Some illustrative non limiting examples of compounds I-III include:

$HO-(CH_2-CH_2-CH_2-CH_2)_{11}-OH;$

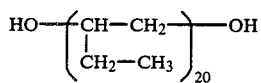

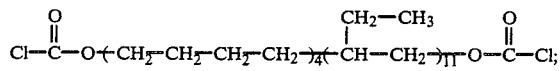

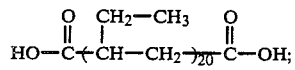

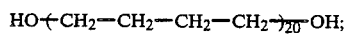

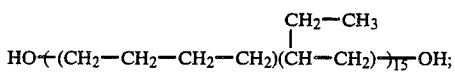

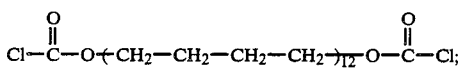

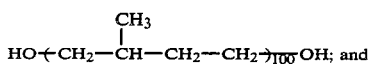

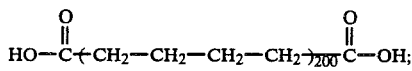

Preferred compounds, from the standpoint of the instant invention, are those represented by Formulae I and III, with those represented by Formula I being particularly useful.

The amount of the compounds I-III utilized in the preparation of the carbonate polymers of the instant invention is an amount which is at least effective to improve the important properties, e.g., impact strength, of the carbonate resin. Generally this amount is at least about one weight percent, preferably at least about 2 weight percent, more preferably at least about 3 weight percent, and most preferably at least about 4 weight percent. Weight percent of compounds of Formulae I-III is based on the total amounts of said compounds and dihydric phenol utilized in the preparation of the instant carbonate resins.

In general, if less than about one weight percent of compounds I-III is used there is no significant improvement in the impact properties of the resin.

At higher amounts of the compounds of the instant invention the carbonate resins exhibit rubbery or elastomeric characteristics. Generally, the carbonate resins exhibit these rubbery or elastomeric properties when more than about 40 weight percent of the instant compounds are used in the preparation of the carbonate resins.

The upper limit of the amount of compounds I-III that may be used generally is dependant upon the properties that it is desired for the carbonate resin to exhibit. Thus, for example, if it is desired to produce a resin exhibiting a high degree of rubbery and elastomeric properties relatively large amounts of the compounds I-III may be employed. If a resin exhibiting a lesser degree of rubbery or elastomeric characteristics is desired a smaller amount of these compounds are employed. Generally if extremely large amounts of the compounds of this invention are used the advantageous physical characteristics of polycarbonates are changed. Generally, about 75 weight percent, preferably about 70 weight percent, of the instant compounds should not be exceeded.

Generally a resin which is derived from about one to about 40 weight percent, preferably from about 2 to about 25 weight percent, and more preferably from about 3 to about 20 weight percent, of the instant compounds possesses a good mix of properties which include improved impact properties and, to a substantial degree, substantially most of the advantageous physical properties of carbonates.

If the compound used in the preparation of the polycarbonates resins is a compound of Formula III, i.e., a bishaloformate, it is generally preferred that the halogen radicals represented by X be selected from chlorine and bromine. Particularly useful bishaloformates are the bischloroformates.

In the preparation of the instant carbonate resins only one compound of Formula I, II, or III may be used or a mixture of two or more different compounds of Formulae I, II, and III may be used, The dihydric phenols useful in the preparation of the instant carbonate polymers are well known and are described, inter alia, in U.S. Pat. Nos. 3,028,365, 2,999,835, 3,148,172, 3,271,368, 2,991,273, 3,271,367, 3,380,078, 3,041,891 and 2,999,846, all of which are hereby incorporated herein by reference.

These dihydric phenols generally conform to the formula

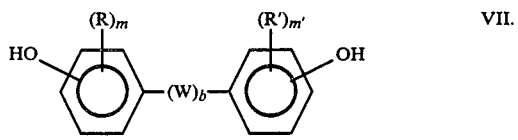

wherein:

R is independently selected from halogen, monovalent hydrocarbon, and monovalent hydrocarbonoxy radicals;

R' is independently selected from halogen, monovalent hydrocarbon, and monovalent hydrocarbonoxy radicals;

W is selected from divalent hydrocarbon radicals,

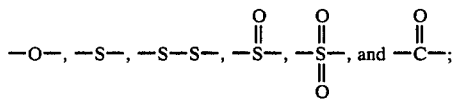

m amd m' are independently selected from integers having a value of from 0 to 4 inclusive; and b is either zero or one.

Preferred halogen radicals represented by R and R' are chlorine and bromine. The monovalent hydrocarbon radicals represented by R include alkyl, cycloalkyl, aryl, aralkyl, and alkaryl radicals.

The preferred alkyl radicals represented by R and R' are those containing from 1 to about 10 carbon atoms. The preferred cycloalkyl radicals represented by R and R' are those containing from 4 to about 8 ring carbon atoms. The preferred aryl radicals are those containing from 6 to 12 ring carbon atoms, i.e., phenyl, naphthyl, and biphenyl. The preferred aralkyl and alkaryl radicals are those containing from 7 to about 14 carbon atoms.

The monovalent hydrocarbonoxy radicals represented by R and R' have the general formula —OR", wherein R" has the same meaning as R and R'. The preferred hydrocarbonoxy radicals are the alkoxy and the aryloxy radicals.

The divalent hydrocarbon radicals represented by W include the alkylene radicals, alkylidene radicals, cycloalkylene radicals, and cycloalkylidene radicals. Preferred alkylene radicals are those containing from 2 to about 20 carbon atoms. Preferred alkylidene radicals are those containing from 1 to about 20 carbon atoms. Preferred cycloalkylidene and cycloalkylene radicals are those containing from 6 to about 16 ring carbon atoms.

Some illustrative non-limiting examples of the dihydric phenols of Formula VII include:

2,2-bis(4-hydroxyphenyl)propane (bisphenol-A);
2,2-bis(3,5-dimethyl-4-hydroxyphenyl)propane;
2,2-bis(3,5-dibromo-4-hydroxyphenyl)propane;
1,1-bis(4-hydroxyphenyl)cyclohexane;
1,1-bis(4-hydroxyphenyl)cyclododecane;
1,1-bis(3,5-dimethyl-4-hydroxyphenyl)cyclododecane;
1,1-bis(4-hydroxyphenyl)pentane;
bis(4-hydroxyphenyl)methane;
bis(3,5-diethyl-4-hydroxyphenyl)methane;
1,3-bis(4-hydroxyphenyl)propane;
4,4'-thiodiphenol; and
4,4'-dihydroxy-2,6-dimethyldiphenyl ether.

The carbonate precursors useful in the practice of the instant invention include the carbonyl halides, the bishaloformates, and the diaryl carbonates. The carbonyl halides include carbonyl chloride, carbonyl bromide, and mixtures thereof. The bishaloformates include the bishaloformates of dihydric phenols such as bisphenol-A, hydroquinone, and the like; and the bishaloformates of glycols such as ethylene glycol and neopentyl glycol. Typical of the diarylcarbonates are diphenyl carbonate and the di(alkylphenyl)carbonates such as di(tolyl) carbonate. Some other illustrative examples of suitable diarylcarbonates include di(naphthyl) carbonate, phenyl tolyl carbonate, and the like.

The preferred carbonate precursors are the carbonyl halides with carbonyl chloride, also known as phosgene, being the preferred carbonyl halide.

The polycarbonates of the instant invention may be prepared by known conventional processes such as, for example, interfacial polymerization, the pyridine process, melt polymerization, and the like. Particularly useful processes for the preparation of the polycarbonates of the instant invention are the interfacial polymerization process and the pyridine process.

The interfacial polymerization process involves the use of an aqueous caustic solution, an organic water immiscible solvent such as methylene chloride, at least one dihydric phenol of Formula VII, a carbonate precursor, at least one compound of Formulae I–III, a catalyst, and a molecular weight regulator.

The catalysts which may be employed can be any of the well known catalysts which catalyze the polycarbonate forming reaction. These catalysts include, but are not limited to, tertiary amines such as triethylamine, quaternary ammonium compounds, and quaternary phosphonium compounds.

The molecular weight regulators employed may be any of the known compounds that regulate the molecular weight of the carbonate polymer by a chain terminating mechanism. These compounds include, but are not limited to, phenol, tertiary-butyl phenol, chroman-I, and the like.

The pyridine process involves the use of an organic base such as pyridine, an organic solvent such as methylene chloride, at least one dihydric phenol, a carbonate precursor, at least one compound of Formulae I–III, a catalyst, and a molecular weight regulator.

Also included herein are the randomly branched thermoplastic polycarbonates. These randomly branched carbonates are prepared by using a minor amount, typically between about 0.05 to about 2 mole percent, of a polyfunctional aromatic branching agent. These polyfunctional aromatic compounds contain at least three functional groups which may be hydroxyl, carboxyl, carboxylic anhydride, and haloformyl. Some illustrative non-limiting examples of these compounds include trimellitic anhydride, trimellitic acid, trimellityl trichloride, 4-chloroformyl phthalic anhydride, pyromellitic dianhydride, mellitic acid, mellitic anhydride, trimesic acid, and the like.

The polycarbonates of the instant invention have a weight average molecular weight of from about 20,000 to about 200,000, preferably from about 30,000 to about 150,000. They have an intrinsic viscosity, as measured in methylene chloride at 25° C., of at least about 0.4 dl/gm.

If compounds of Formula I are utilized in the preparation of the instant polycarbonates it is preferred to use the pyridine process to form these polycarbonates. If, on the other hand, compounds of Formula III are utilized in the preparation of the instant polycarbonates it is preferred to use the interfacial polymerization process to form these polycarbonates.

Polycarbonates of the instant invention prepared by the pyridine process utilizing at least one compound of Formula I as one of the reactants contain the following recurring structural units:

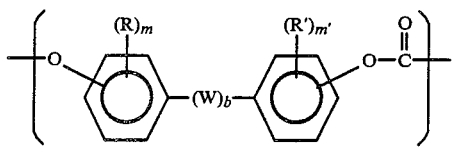

VIII.

and

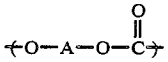

VIIIa.

wherein R, R', W, A, m, m' and b are as defined hereinafore.

Polycarbonates of the instant invention prepared by the interfacial polymerization process using at least one compound of Formula III as one of the reactants contain the following recurring structural units:

VIII, and

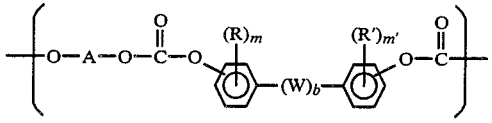

IX.

wherein R, R', W, A, m, m' and b are as defined hereinafore.

In the instant polycarbonate resins the amount of structural units VIIIa or IX present in the polymer chain is dependant upon the amounts of compounds I or 111, respectively, used in the preparation of the polycarbonate resins of the instant invention.

The polycarbonates of the instant invention may optionally have admixed therewith the commonly known and used additives such as, for example, antioxidants; mold release agents; antistatic agents; inert fillers such as glass, talc, mica, and clay; ultraviolet radiation absorbers such as the benzophenones, benzotriazoles, and cyanoacrylates; hydrolytic stabilizers such as the epoxides; color stabilizers such as the organophosphites; colorants; and flame retardants.

Some useful flame retardants are the alkali and alkaline earth metal salts of organic sulfonic acids. These types of flame retardants are disclosed, inter alia, in U.S. Pat. Nos. 3,933,734, 3,948,851, 3,926,908, 3,919,167, 3,909,490, 3,953,396, 396, 3,931,100, 3,978,024, 3,953,399, 3,917,559, 3,951,910 and 3,940,366, all of which are incorporated herein by reference.

Also included within the scope of the instant invention are the copolyester-carbonates. Briefly stated the copolyester-carbonates comprise recurring carbonate groups, carboxylate groups, and aromatic carbocyclic groups in the linear polymer chain in which at least some of the carbonate groups and at least some of the carboxylate groups are bonded directly to the ring carbon atoms of the aromatic carbocyclic groups.

These copolyester-carbonates contain ester bonds and carbonate bonds in the polymer chain, wherein the amount of the ester bonds is from about 25 to about 90 mole percent, preferably from about 35 to about 80 mole percent. For example, 5 moles of bisphenol-A reacting completely with 4 moles of isophthaloyl dichloride and one mole of phosgene would give a copolyester-carbonate of 80 mole percent ester bonds.

The copolyester-carbonates of the instant invention are derived from (i) at least one dihydric phenol of Formula VII, (ii) a carbonate precursor, (iii) an ester precursor, and (iv) an impact modifying amount of at least one compound of Formula I-III.

The ester precursor is a difunctional carboxylic acid or an ester forming reactive derivative thereof. In general, any difunctional carboxylic acid or its ester forming reactive derivative conventionally used in the preparation of linear polyesters may be utilized in the preparation of the insatnt copolyester-carbonates. Generally, the difunctional carboxylic acids which may be used include the aliphatic carboxylic acids, the aliphatic-aromatic carboxylic acids, and the aromatic carboxylic acids. These acids are described in U.S. Pat. No. 3,169,121, which is hereby incorporated herein by reference.

The preferred difunctional carboxylic acids or their ester forming reactive derivatives are the aromatic carboxylic acids or their ester forming reactive derivatives. Particularly useful difunctional aromatic carboxylic acids are isophthalic acid, terephthalic acid, and mixtures thereof.

Instead of using the difunctional carboxylic acids as the ester precursor it is preferred to utilize their ester forming reactive derivatives. Thus, for example, instead of using isophthalic acid, terephthalic acid, or mixtures thereof it is preferred to use isophthaloyl dichloride, terephthaloyl dichloride, or mixtures thereof.

The copolyester-carbonates of the instant invention may be prepared by well known and conventional methods. These methods include transesterification, melt polymerization, interfacial polymerization, and the pyridine process. Various of these conventional processes are described in U.S. Pat. Nos. 3,169,121, 3,030,331, 3,027,814 and 4,118,314, all of which are incorporated herein by reference.

Particularly useful processes for the preparation of these copolyester-carbonates are the interfacial polymerization process and the pyridine process.

Copolyester-carbonates of the instant invention prepared by the pyridine process utilizing as the reactants (i) at least one dihydric phenol of Formula VII, (ii) a carbonate precursor, (iii) at least one ester precursor, and (iv) at least one compound of Formula I, contain at least the following structural units: VIII, VIIIa,

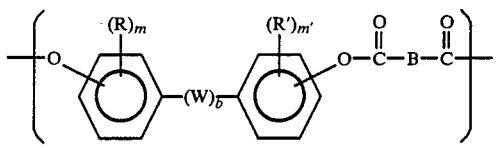

X.

and

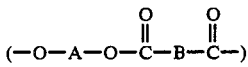

Xa.

wherein A, R, R', W, m, m' and b are as defined hereinafore, and B is the residue of the ester precursor. B in Formulae X and Xa is preferably the residue of an aromatic dicarboxylic acid or its ester forming reactive derivative such as the acid dichloride. Preferred residues of aromatic dicarboxylic acids or their ester forming reactive derivatives are represented by the formula

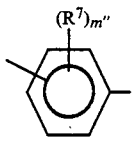

XI.

wherein $R^7$ has the same meaning as R and R' above and m" is an integer having a value of from 0 to 4 inclusive. Preferably $R^7$ is independently selected from lower alkyl radicals containing from 1 to about 5 carbon atoms.

Copolyester-carbonates of the instant invention prepared by the interfacial polymerization process utilizing as the reactants (i) at least one dihydric phenol of Formula VII, (ii) a carbonate precursor, (iii) at least one ester precursor, and (iv) at least one compound of Formula III, contain the following recurring structural units:

VIII, IX, X, and

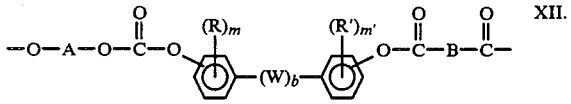

XII.

wherein A, B, R, R', m, m' and b are as defined hereinafore.

The amounts of recurring structural units of Formulae VIIa, IX, Xa, and XII that are present in the polymer chain are dependant upon the amounts of compounds of Formulae I or III used in the preparation of the instant copolyester-carbonate resins.

Also included within the scope of the instant copolyester-carbonate resins are the thermoplastic randomly branched copolyester-carbonate resins. These randomly branched copolyester-carbonate resins are prepared by using the amounts and types of branching agents described hereinafore in the preparation of the polycarbonate resins.

The copolyester-carbonate resins of this invention may optionally have admixed therewith the aforedescribed additives.

The instant copolyester-carbonates have a weight average molecular weight of from about 20,000 to about 200,000, preferably from about 30,000 to about 150,000.

These copolyester-carbonates have an intrinsic viscosity, as measured in methylene chloride at 25° C., of at least about 0.4 dl/gm preferably from 0.45 to about 1.0 dl/gm.

DESCRIPTION OF THE PREFERRED EMBODIMENT

In order to more fully and clearly illustrate the present invention the following examples are set forth. It is intended that the examples be considered as illustrative of rather than limiting the invention as disclosed and claimed herein. In the examples all parts and percentages are on a weight basis unless otherwise indicated.

The following example illustrates a polycarbonate resin falling outside the scope of the instant invention. This example is presented for comparative purposes only.

EXAMPLE 1

Into a mixture of 75 grams of 2,2-bis(4-hydroxyphenyl)propane (bisphenol-A), 75 grams of hydroxyterminated unsaturated (non-hydrogenated) 1,2-polybutadiene (molecular weight of about 3,000, sold by Nippon Soda Co., Ltd. under the trade designation G-3000), 660 milliliters methylene chloride, 450 milliliters water, and 1 milliliter triethylamine was introduced, at ambient temperature, 375 grams of phosgene over a period of 50 minutes while maintaining the pH of the two phase system between 10.5–11.5 by simultaneously adding a 50% aqueous sodium hydroxide solution. At the end of the phosgene addition period the methylene chloride phase was separated from the aqueous phase, washed with an excess of dilute (0.01 N) aqueous HCl and then washed two times with water.

The polymer was precipitated in hot water and dried at 125° C. The resultant polycarbonate, which had an intrinsic viscosity in chloroform at 25° C. of 1.07 dl/gm, was compression molded into 20 mil film at about 500° F.

The color of this polymer was observed both before and after heat aging for 8 hours at 125° C. The results are set forth in Table I.

The following examples illustrate the polycarbonates of the instant invention.

EXAMPLE 2

The procedure of Example 1 is substantially repeated except that the 75 grams of G-3000 are replaced with 75 grams of hydroxy terminated hydrogenated 1,2-polybutadiene (molecular weight of about 3000, sold by Nippon Soda Co., Ltd. under the trade designation G-I-3000)

The resultant polycarbonate, which had an intrinsic viscosity in chloroform at 25° C. of 1.18 dl/gm, was compression molded into a 20 mil film at about 500° F. This material was transparent and elastomeric and exhibited a yield elongation of 100%. Differential scanning Calorimetry revealed a second order glass transition temperature of −23° C. and 143° C.

The color of this polymer was observed both before and after heat aging for 8 hours at 125° C. and the results are set forth in Table I.

TABLE I

| Example No. | Color | |
|---|---|---|
| | Initial | After heat aging |
| 1 | white | brown |
| 2 | white | white |

Poor heat stability is indicated by the polymer of Example 1 turning brown on exposure to heat.

EXAMPLE 3

Into a mixture of 3360 grams of 2,2-bis (4-hydroxyphenyl)propane, 5040 grams of 2,2-bis (3,5-dibromo-4-hydroxyphenyl)propane, 2800 grams of carboxy terminated hydrogenated 1,2-polybutadiene (molecular weight of about 1,000, sold by the Nippon Soda Co., Ltd. under the trade designation C-I-1000), 35 liters of water, 40 liters of methylene chloride, and 300 milliliters of triethylamine were introduced, at ambient temperatures, 3200 grams of phosgene over a period of 32 minutes while maintaining the pH of the two phase system between 8 and 9 for the first 5 minutes then at about 11, i.e., 10.5–11.5, by simultaneously adding a 50% aqueous sodium hydroxide solution. At the end of the phosgene addition period the methylene chloride phase was separated from the aqueous phase, washed with an excess of dilute (0.01N) aqueous HCl, and then washed two times with water. The polymer was precipitated by steam and dried at 95° C. The resultant polymer, which had an intrinsic viscosity in chloroform at 25° C. of 0.54 dl/gm, was fed to an extruder operating at about 500° F., and the extrudate was comminuted into pellets. The pellets were injection molded into test specimens measuring 125 mil thick for heat distortion under load (HDTUL) determination, ASTM D-648, for hardness determination, and for flexural property determination, ASTM D-790. The results are set forth in Table II.

EXAMPLE 4

The procedure of Example 3 is substantially repeated using 2996 grams of bisphenol-A, 4495 grams 2,2-bis(3,5-dibromo-4-hydroxyphenyl)propane, and 4000 grams C-I-1000.

The resultant polymer had an intrinsic viscosity, as measured in chloroform at 25° C., of 0.48 dl/gm. The specimens of this polymer were measured for the physical properties described in Example 3 and the results are set froth in Table II.

TABLE II

| | Example No. 3 | Example No. 4 |
|---|---|---|
| Soft block, wt. % | 24 | 33 |
| Bromine, wt. % | 26 | 23 |
| Specific gravity, g/cc | 1.33 | 1.30 |
| HDTUL, 66 psi, °F. | 272 | 252 |
| Flexural Modulus, psi | 230,000 | 165,000 |
| Flexural Strength, psi | 10,100 | 7,100 |
| Hardness: | | |
| Rockwell | R111 | R103 |
| Shore D | 82 | 78 |

EXAMPLE 5

The procedure of Example 1 is substantially repeated using 91.3 grams of bisphenol-A, 11.4 grams of G-I-3000, and 1.35 gram of p-tertiarybutyl phenol chain stopper.

The resultant polymer had an intrinsic viscosity, as measured in chloroform at 25° C., of 0.64 dl/gm and second order glass transition temperatures of −22° C. and 149° C.

EXAMPLE 6

The procedure of Example 1 is substantially repeated using 75 grams of bisphenol-A, 60 grams of G-I-3000, 0.5 gram of p-tertiarybutyl phenol chain stopper, 500 milliliters of methylene chloride, 450 milliliters of water, and 0.25 milliliter of triethylamine.

The resultant polymer had an intrinsic viscosity, as measured in chloroform at 25° C., of 0.53 dl/gm.

EXAMPLE 7

The procedure of Example 6 is substantially repeated using 1/8 milliliter of triethylamine.

The resultant polymer had an intrinsic viscosity, as measured in chloroform at 25° C., of 0.57 dl/gm.

EXAMPLE 8

The procedure of Example 1 is substantially repeated using 75 grams of bisphenol-A, 60 grams of G-I-3000, 0.5 gram of p-tertiarybutyl phenol, 500 milliliters of methylene chloride, 450 milliliters of water, and 0.25 milliliter of triethylamine. The pH during the first 5 minutes of phosgenation was between 7 and 9, then the pH was raised to about 11 for the remainder of the phosgenation.

The resultant polymer had an intrinsic viscosity, as measured in chloroform at 25° C., of 0.55 dl/gm.

EXAMPLE 9

Into a mixture of 2270 grams of bisphenol-A, 284 grams of G-I-3000, 37 grams of p-tertiarybutyl phenol, 25 milliliters of triethylamine, 10 liters of methylene chloride, and 10 liters of water were introduced, at ambient temperature, 1200 grams of phosgene over a period of 50 minutes while maintaining the pH of the two phase system at about 11, i.e., 10.5–11.5, by simultaneously adding a 25% aqueous sodium hydroxide solution.

At the end of the addition period the pH of the aqueous phase was 11.7 and the bisphenol-A content of this phase was less than about 1 part per million as determined by ultraviolet analysis. The methylene chloride phase was separated from the aqueous phase, washed with an excess of dilute (0.01 N) aqueous HCl, and then washed three times with water. The polymer was precipitated by steam and dried at 125° C.

The resultant polymer had an intrinsic viscosity as measured in chloform at 25° C. of 0.49 dl/gm. The dry polymer was fed to an extruder operating at about 550° F., and the extrudate was comminuted into pellets. The pellets were injection molded into test specimens measuring 125 mils thick for impact strength determination according to the Notched Izod test, ASTM D-256.

The retention of impact strength on heat aging of the test samples at 90° C. appears in Table III and is compared with polycarbonate samples derived solely from bisphenol-A and phosgene (i.e., containing no hydrogenated 1,2-polybutadiene).

TABLE III

| Hours at 90° C. | Notched Izod (ft-lbs/in) | |
|---|---|---|
| | Example No. 9 | BPA Polycarbonate* |
| 0 | 18.5 | 15.6 |
| 24 | 16.7 | 7.8 |
| 48 | 15.9 | 4.7 |

*This polymer had an intrinsic viscosity, as measured in methylene chloride at 25° C., of 0.50 dl/gm.

As shown by the data in Table III the polycarbonates of the instant invention exhibit better impact strength, both initially and after heat aging, than conventional prior art polycarbonates which do not contain the compounds of Formulae I–III of the instant invention.

In general, the instant carbonate polymers may be described as being multi-phase block copolymers.

The two glass transition temperatures are present due to there being being two discrete phases in the instant multi-phase block copolymer, i.e., a polycarbonate and a soft segment phase.

Additionally the molded test samples of the polycarbonates of the instant examples were subjected to visual inspection and were found to be transparent.

The instant carbonate resins may be used to form molded articles, shaped articles, films, glazing materials, and the like.

It will thus be seen that the objects set forth above, among those made apparent from the preceding description, are efficiently attained, and since certain modifications may be made in carrying out the above processes and in the compositions set forth without departing from the scope of the instant invention, it is intended that all matters contained in the above description shall be interpreted as illustrative and not in a limiting sense.

What is claimed is:

1. A thermoplastic aromatic carbonate resin comprised of the polymerized reaction products of:
   (i) at least one dihydric phenol;
   (ii) a carbonate precursor; and
   (iii) an amount at least effective to improve the impact properties of said resin of at least one polymer selected from polymers represented by the formulae

HO—A—OH,

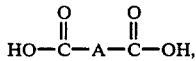

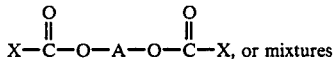, or mixtures thereof;
wherein A is selected from the divalent residue of at least one polymerized and substantially fully hydrogenated alkadiene and has a weight average molecular weight of at least about 600 and up to about 20,000, and X is independently selected from halogen radicals.

2. The resin of claim 1 wherein said amount of (iii) is at least about one weight percent based on the total amounts of (i) and (iii) employed.

3. The resin of claim 2 wherein said amount of (iii) is at least about 2 weight percent.

4. The resin of claim 3 wherein said amount of (iii) is at least about 3 weight percent.

5. The resin of claim 4 wherein said amount of (iii) is at least about 4 weight percent.

6. The resin of claim 1 wherein said alkadienes are represented by the formula

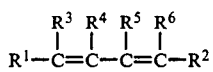

wherein $R^1$–$R^6$ are independently selected from hydrogen, alkyl radicals, and halogen radicals, with the proviso that not more than two of $R^1$–$R^6$ are halogen radicals.

7. The resin of claim 6 wherein $R^1$–$R^6$ are independently selected from alkyl radicals and hydrogen.

8. The resin of claim 7 wherein said alkadiene is 1,3-butadiene.

9. The resin of claim 7 wherein said alkadiene is 2-methyl-1,3-butadiene.

10. The resin of claim 7 wherein said alkadiene is comprised of a mixture of 1,3-butadiene and 2-methyl-1,3-butadiene.

11. The resin of claim 1 wherein (iii) is

HO—A—OH.

12. The resin of claim 11 wherein said carbonate precursor is phosgene.

13. The resin of claim 12 wherein said dihydric phenol is bisphenol-A.

14. The resin of claim 1 wherein (iii) is

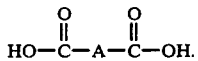

15. The resin of claim 14 wherein said carbonate precursor is phosgene.

16. The resin of claim 15 wherein said dihydric phenol is bisphenol-A.

17. The resin of claim 1 wherein (iii) is

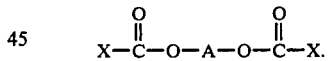

18. The resin of claim 17 wherein said carbonate precursor is phosgene.

19. The resin of claim 18 wherein said dihydric phenol is bisphenol-A.

20. The resin of claim 1 wherein said aromatic carbonate resin is a copolyester carbonate resin comprised of the reaction product of (i), (ii), (iii), and (IV) at least ester selected from difunctional carboxylic acids or ester forming reactive derivatives thereof, said copolyester-carbonate resin containing from about 25 to about 95 mole % ester bonds.

21. The resin of claim 20 wherein said ester forming reactive derivative is selected from isophtaloyl dihalide, terephthaloyl dihalide, or mixtures thereof.

22. The resin of claim 20 wherein said alkadienes are represented by the formula

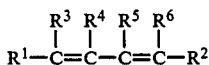

wherein $R^1$-$R^6$ are independently selected from hydrogen, alkyl radicals, or halogen radicals, with the proviso that not more than two of $R^1$-$R^6$ are halogen radicals.

23. The resin of claim 22 wherein $R^1$-$R^6$ are independently selected from hydrogen or alkyl radicals.

24. The resin of claim 23 wherein said alkadienes are selected from 1,3-butadiene, 2-methyl-1,3-butadiene, or mixtures thereof.

25. The resin of claim 20 wherein (iii) is

HO—A—OH.

26. The resin of claim 20 wherein (iii) is

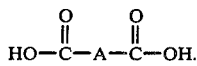

27. The resin of claim 20 wherein (iii) is

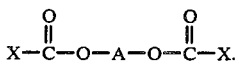

* * * * *